United States Patent
Calderón Gómez

(10) Patent No.: US 12,466,575 B2
(45) Date of Patent: Nov. 11, 2025

(54) CONDITIONING SYSTEM FOR AN AIRCRAFT

(71) Applicant: AIRBUS OPERATIONS, S.L.U., Madrid (ES)

(72) Inventor: Pablo Manuel Calderón Gómez, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 18/784,682

(22) Filed: Jul. 25, 2024

(65) Prior Publication Data
US 2025/0042568 A1 Feb. 6, 2025

(30) Foreign Application Priority Data
Jul. 31, 2023 (EP) ..................................... 23382799

(51) Int. Cl.
| F02C 7/224 | (2006.01) |
| B64D 37/30 | (2006.01) |
| B64D 37/34 | (2006.01) |
| F02C 7/141 | (2006.01) |

(52) U.S. Cl.
CPC ............. *B64D 37/34* (2013.01); *B64D 37/30* (2013.01); *F02C 7/141* (2013.01); *F02C 7/224* (2013.01)

(58) Field of Classification Search
CPC .... F02C 7/224; F02C 7/232; F05D 2260/205; F05D 2260/213; F23R 3/36
See application file for complete search history.

(56) References Cited

U.S. PATENT DOCUMENTS

| 5,845,481 | A | * | 12/1998 | Briesch | ................... | F02C 7/224 |
| | | | | | | 60/776 |
| 9,695,750 | B2 | * | 7/2017 | Wollenweber | ............ | F02C 9/40 |
| 10,815,906 | B2 | * | 10/2020 | Veilleux, Jr. | ............... | F02C 7/14 |
| 11,047,307 | B2 | | 6/2021 | Roberge | | |
| 11,773,782 | B2 | * | 10/2023 | Johnson | .................... | F02C 3/22 |
| | | | | | | 60/736 |
| 11,905,884 | B1 | * | 2/2024 | Dindar | ....................... | F02C 3/22 |
| 2021/0207540 | A1 | * | 7/2021 | Roberge | ................... | F02C 9/40 |
| 2022/0099299 | A1 | * | 3/2022 | Carrotte | .................... | F23R 3/50 |
| 2024/0254920 | A1 | * | 8/2024 | Terwillger | ............... | F02C 3/24 |

FOREIGN PATENT DOCUMENTS

| EP | 3904658 A1 | 11/2021 |
| EP | 3978807 A2 | 4/2022 |
| EP | 4089271 A1 | 11/2022 |

OTHER PUBLICATIONS

Extended European Search Report for EP 23382799.7, dated Jan. 9, 2024, 11 pages.

\* cited by examiner

*Primary Examiner* — Thuyhang N Nguyen
(74) *Attorney, Agent, or Firm* — Nixon & Vanderhye P.C.

(57) ABSTRACT

An aircraft conditioning system including: a fuel inlet (2) to a fuel conduit (3), an engine (4), a first heat exchanger (6) connected to a power unit outlet (5) of the engine, a first portion (3.1) of the fuel conduit (3) connecting the fuel inlet (2) to a fuel inlet (6.3) of the first heat exchanger (6) and a second portion (3.2) connecting a fuel outlet (6.4) of the first heat exchanger (6) to an inlet (4.1) of the engine (4), a heater (7) converting liquid fuel in the fuel conduit (3) to a low temperature gas form, a bypass conduit (8) connecting the first and second portions (3.1, 3.2) wherein the first heat exchanger (6) transfers heat from exhaust gases of the power unit outlet (5) to fuel of the fuel conduit (3).

18 Claims, 3 Drawing Sheets

CONDITIONING SYSTEM FOR AN AIRCRAFT

RELATED APPLICATION

This application incorporates by reference and claims priority to European patent application EP 23382799.7, filed Jul. 31, 2023.

TECHNICAL FIELD

The present invention relates to a conditioning system for an aircraft. In particular, the present invention belongs to a conditioning system having a new architecture including a power unit and a heat exchanger located at the output of the power unit.

The present invention also relates to an aircraft comprising said conditioning system and to a method for conditioning fuel by means of the conditioning system of the invention.

BACKGROUND

Auxiliary power units (APUs) are well known in the aeronautical technical field for being engines capable of supplying energy to functions of an aircraft that are not considered as propulsion functions. APUs are generally found in large aircrafts and located at/or near to the tail cone part of these aircrafts.

Typical APUs generally comprise a power section being the power-producing section of the APU, a load compressor section providing pneumatic power for the aircraft and a gearbox section responsible for transferring power from the main shaft of the engine to a generator for electrical power. APUs are also known for allowing an aircraft to be autonomous of the external electrical and pneumatic power sources on the ground and in-flight.

Additionally, Auxiliary Power Units in an aircraft can be used for replacing the primary engines when they are not running when said aircraft is on-ground. APUs also sustain temporal power to start the primary engines during normal operations, they can be used to replace the power generated by primary engines when failed for dispatch conditions or continuously implemented for supplying emergency power until the aircraft lands.

The prior art discloses engine implementing hydrogen combustion applied in the aeronautical and automotive fields.

Also, in the field of gas turbine for aircraft, well known technologies provide exhausting gas heat recovery. However, these techniques and technologies used nowadays are applicable to fossil fuel engines.

Known issues of hydrogen engine are based on conditioning the hydrogen fuel up to ambient temperature and correct pressure in order to feed the engine of the APU in proper conditions and, also, ensuring a secured combustion avoiding damages in the different components and conduits of said Auxiliary Power Unit. Due to its storing conditions, around 20 K in the aeronautic field of technique, hydrogen is a fuel which requires particular sizing and particular operational conditions of the system consuming this type of fuel.

Also, additional known problems of using hydrogen for an engine in an aircraft is due to phase transitions since, when stored in the aircraft before feeding the engine, the hydrogen is in liquid phase. However, in order for the engine of an APU to work in optimal manners, the liquid hydrogen has to be brought through a phase transition from liquid to gas. These phase changes also requires that the system is designed and sized in such a way that hydrogen stays stable while its conditions (Temperature, Pressure, Phase etc.) is changing throughout the whole Auxiliary Power System.

Finally, in the state of the art, some architectures for conditioning the fuel introduced inside the power unit of an aircraft may include an additional fluid capable of retrieve heat recovered from the exhaust gases at the output of the power unit. Said heat is then transferred to the fuel before injection into the engine thanks to an evaporator and through an additional circuit. Known issues of the architectures of the state of the art make the overall system complex to implement, heavy regarding the whole aircraft weight and heavy equipment maintenance.

SUMMARY

There is a need in the art for a conditioning system allowing to condition fuel, such as hydrogen, while optimizing the overall weight and complexity of said conditioning system. The conditioning system should also satisfy the requirements of hydrogen conditioning such as operational requirements, functional requirements and safety requirements in order to maintain the fuel, e.g. hydrogen, in its optimal condition in any flight or ground operation of the aircraft.

In a first inventive aspect, the invention provides a conditioning system for an aircraft comprising a power unit wherein the power unit comprises: a fuel inlet configured to supply liquid fuel to a fuel conduit, an engine comprising: an inlet connected to the fuel conduit and an outlet connected to a power unit outlet, the power unit outlet being configured to exhaust gases out of the engine, a first heat exchanger connected to the power unit outlet comprises an exhaust gas inlet, an exhaust gas outlet, a fuel inlet and a fuel outlet, a first portion of the fuel conduit connecting the fuel inlet of the conditioning system to the fuel inlet of the first heat exchanger and a second portion of the fuel conduit connecting the fuel outlet of the first heat exchanger to the inlet of the engine, heater comprising a fuel inlet and a fuel outlet, the heater being located between the first heat exchanger and the engine and wherein the heater are configured to supply heat to the fuel of the fuel conduit and are also configured to turn the fuel of the fuel conduit from liquid form or supercritical fluid form (SCF) into low temperature gas form, a bypass conduit configured to connect the first portion of the fuel conduit to the second portion of the fuel conduit, wherein the first heat exchanger is configured to transfer heat from the exhaust gases of the power unit outlet to the fuel of the fuel conduit.

The conditioning system of the present invention comprises a power unit. In some embodiments, the power unit is an Auxiliary Power Unit, also called APU, or any propulsion system configured for delivering power to an aircraft. In the particular embodiment of the power unit being an APU, said Auxiliary Power Unit is configured for providing standard APU functions, which are to deliver electrical and pneumatic power for ground operations and flight operations. Also, the conditioning system is suitable to be installed in an aircraft.

The power unit of the invention comprises a fuel inlet which provides the liquid fuel to the fuel conduit.

The fuel provided to the fuel inlet is in a liquid phase and previously stored at specific temperature and pressure conditions before injection in the conditioning system. embodiments, the fuel is stored at a temperature in a range between 20 K to 30 K. At the fuel inlet, said fuel is injected at a temperature comprised in said temperature range.

The conditioning system of the present invention also comprises heater, a first heat exchanger and an engine.

In the first inventive aspect of the invention, the heater are located between the first heat exchanger and the engine. The heater are configured to supply heat to the fuel of the fuel conduit so that the fuel reaches the required temperature before injection inside the engine. In embodiments, at the fuel outlet of the heater, the fuel is at a temperature around 290 K.

In operative mode, when the first heat exchanger is not reaching its optimal mode, the heater supply the necessary heat for providing the delta of temperature to the fuel, in gas form, in order to reach the required temperature before injection in the engine. That is, for example, if the required temperature is 290 K and the temperature at the fuel output of the first heat exchanger is lower than 290 K, the heater are configured for providing the remaining heat necessary until the fuel reaches the temperature of 290 K.

At the same time, the heater are configured to turn the fuel of the fuel conduit from liquid form or supercritical fluid form (SCF) into low temperature gas form, that is, the heater also comply with the function of evaporating means. One of the main functions of the evaporating means is to condition the fuel entering the heater from an inlet temperature to an outlet temperature where the outlet temperature is significantly higher than the inlet temperature while said fuel also transforms the fuel from liquid form or supercritical fluid form (SCF) into low temperature gas form. Thus, the heater is able to resist and adapt to the change of phase of the fuel, that is, from liquid to gas.

The heater are to be considered as a support to the conditioning system of the invention, which, in operative mode, is to be turned off, and the first heat exchanger of the conditioning system is providing the whole required energy/heat to the fuel of the fuel conduit.

In other words, the heater energy provided to the fuel of the fuel conduit is decreasing at the same time the energy provided to the fuel conduit by the first heat exchanger is increasing. That is, the balance between the heater and the first heat exchanger is to be considered as an active control performed by the conditioning system, more particularly an active control of the conditions of the fuel of the power unit, more particularly its temperature.

Heating the fuel by means of the heater avoids the conditions of a cold start of the engine, which is considered the worst start-up conditions for any embodiment of the power unit, such as Auxiliary Power Units or propellers. In particular, cold start of the engine is the worst start-up conditions for the power unit since more fuel is necessary for the engine to start and, at the same time, it is when more heat is required from the heater.

The conditioning system of the present invention also comprises a bypass conduit. Said bypass conduit connects the first portion of the fuel conduit to the second portion of the fuel conduit, that is, the conditioning system is able to be adjusted so that the fuel of the fuel conduit is not injected inside the first heat exchanger but directly oriented towards the inlet of the heater.

In particular, the bypass conduit helps avoiding cold-start condition also for the first heat exchanger. Without the presence of the bypass conduit, the fuel would be forced to be injected inside the heat exchanger even when the engine is not running, or recently started, which do not guarantee that the first heat exchanger is able to operate in its optimal conditions. Therefore, in these conditions, the present invention helps avoiding damaging the first heat exchanger thanks to the bypass conduit so that the engine is started and producing exhaust gas in such a quantity that can guarantee that the first heat exchanger is in optimal condition for receiving the liquid fuel through its fuel inlet.

In an embodiment, the heater comprise dedicated external batteries which ensure providing energy to said heater such that heat is provided to the fuel of the fuel conduit by means of the heater while being independent from the generated power of the power unit. In addition, by having dedicated external batteries, the aircraft is considered autonomous.

In an embodiment, the first heat exchanger comprises a plurality of plates housing the liquid fuel from the fuel conduit also called pillow plate heat exchanger (PPHE). Thanks to the heat transferred from the exhaust gases of the engine, the temperature of the liquid fuel increases.

At the fuel inlet of the first heat exchanger, the liquid fuel temperature may be about 20 K such as within 3 K of 20 K. At the fuel outlet of the first heat exchanger, the liquid fuel temperature may be about 290 K, such as within 5 K of 290 K.

In an embodiment, the engine of the invention is a gas turbine.

The conditioning system may provide fuel to the engine of the power unit at the required temperature and in a gas form at any time of the power unit functioning, that is with a fuel at a temperature around 290 K. Therefore, the conditioning system of the invention allows constant and precise control of the fuel conditions before injection inside the engine of the power unit.

Also, the present invention only requires one circuit, the fuel conduit, for performing heat transfer which reduces the overall weight of the conditioning system. The present invention also contributes to facilitating the maintenance of the elements of the system. For example, if a second circuit comprising a working fluid is required for supplying heat, both maintenance and eventual damages of said second circuit may reduce the performances of the conditioning system. That is, the architecture required by the first inventive aspect of the present invention also provides a less complex system for conditioning fuel.

In an embodiment, the conditioning system further comprises a valve configured to open or close the flow of fuel entering the conditioning system at the fuel inlet.

The flow of fuel can be closed if any failure or damage is detected at any time or any element of the conditioning system of the invention.

In an embodiment, the conditioning system further comprises pump configured to supply fuel to the power unit.

The pump rises the pressure of the fuel, in liquid form, before being injected inside the power unit. Also, the pump requires much less power when it is placed close to the fuel inlet of the conditioning system and it actuates on a fuel in liquid form with respect of the power required when the fuel is in gas form.

i. In an embodiment, the conditioning system further comprises a second heat exchanger comprising a first inlet, a first outlet, a second inlet and a second outlet, wherein the first inlet and the first outlet of the second heat exchanger are connected to the first portion of the fuel conduit and the second inlet and the second outlet are connected to the second portion of the fuel conduit, the second heat exchanger being configured: to supply heat from the fuel of the second portion of the fuel conduit to the fuel of the first portion of the fuel conduit, and to turn the fuel of the fuel conduit from liquid form or supercritical fluid form into low temperature gas form.

Thanks to the second heat exchanger, the conditioning system provides enhanced performances since the second heat exchanger supplies heat from the fuel of the second portion of the fuel conduit to the fuel of the first portion of the fuel conduit. That is, the second heat exchanger transfers heat to the fuel of the fuel conduit, right after being introduced in the conditioning system through the fuel inlet, so that the fuel of the first portion of the fuel conduit reaches a temperature at the first outlet, which is higher than its temperature at the first inlet.

When implemented in the conditioning system, the second heat exchanger is able to perform evaporation of the fuel so that the fuel turn from liquid form to gas form before its introduction inside the first heat exchanger.

The second heat exchanger relies on the heat that can be transferred from the fuel once outputted of the first heat exchanger and entering the second portion of the fuel conduit. The temperature of the fuel at the outlet of the first heat exchanger may be higher than the temperature required for the engine to function in its optimal conditions. By providing the fuel outputted of the first heat exchanger at a temperature which is higher than the temperature required for the engine to function in optimal condition, the second heat exchanger is able to supply a certain quantity of heat to the fuel of the first portion of the fuel conduit. Said quantity of heat is determined by the delta of temperature between the temperature of the fuel at the fuel outlet of the first heat exchanger and the temperature required by the engine to be in its optimal condition, such as 90K.

For example, the temperature at the fuel inlet of the conditioning system is 20 K and reaches 110 K after being outputted of the second heat exchanger. At the same time, the fuel have turned to gas form before being injected into the first heat exchanger. At the fuel outlet of the first heat exchanger, the fuel of the second portion of the fuel conduit reaches 380 K, which provides extra heat to the fuel of the first portion of the fuel conduit thanks to the second heat exchanger. Ideally, the second heat exchanger is configured to output the gas fuel at its second outlet at a temperature of 290 K so that the heater remains switched off.

In an embodiment, the conditioning system comprises a valve, such as a mechanical valve, located between the first outlet of the second heat exchanger and the fuel inlet of the first heat exchanger.

The valve helps shutting the entry of fuel inside the first heat exchanger in case of damages or failure detected inside said first heat exchanger.

In an embodiment, the conditioning system further comprises a muffler wherein the first heat exchanger is configured to be coupled inside the muffler.

In an embodiment, the conditioning system comprises a muffler located at the exhaust gas outlet of the first heat exchanger.

The muffler may provide silencing properties at the output of the power unit.

In an embodiment, the first heat exchanger is configured for enclosing the entire perpendicular cross-section of the power unit outlet.

Enclosing the area of the power unit outlet completely with the heat exchanger ensures exploiting the most heat transferred to the fuel of the fuel conduit based on the heat produced by the power unit outlet.

In an embodiment, the fuel inlet and the fuel outlet of the first heat exchanger are mounted in counterflow with respect to the exhaust gas inlet and exhaust gas outlet of the first exchanger.

Mounting the fuel inlet and the fuel outlet of the first heat exchanger in counterflow with respect to the exhaust gas inlet and exhaust gas outlet of the first exchanger helps providing heat to the fuel in a progressively increasing gradient. At the exhaust gas inlet of the first heat exchanger, the temperature of the exhaust gases is higher than when the exhaust gases reaches the exhaust gas outlet. Thus, by mounting the exhaust gas outlet at the same end of the first heat exchanger than the fuel inlet, the fuel inlet is able to progressively increase its temperature inside the first heat exchanger. When the fuel reaches the fuel outlet, it enters in contact with the exhaust gas inlet, where the temperature of the exhaust gas is the highest and the difference of temperature is inferior with respect to the difference of temperatures between the fuel at the fuel inlet and the exhaust gas at the gas inlet.

The heat exchanger provides optimized heat transfer between the exhaust gas and the fuel.

In an embodiment, the first inlet and the first outlet of the second heat exchanger are mounted in counterflow with respect to the second inlet and the second outlet of the second heat exchanger.

As above mentioned, mounting the first inlet and the first outlet of the second heat exchanger in counterflow with respect to the second inlet and the second outlet of the second heat exchanger provides optimized heat transfer between the fuel outputted of the first heat exchanger and the fuel of the first portion of the fuel conduit. It helps to a progressive increase gradient of temperature along while the fuel is located inside the second heat exchanger.

In an embodiment, the conditioning system further comprises at least one temperature sensor.

In an embodiment, the conditioning system comprises temperature sensors located at the inlets and outlets of the first heat exchanger, the second heat exchanger and the heater respectively.

In an embodiment, the conditioning system further comprises at least two pressure sensors located at the fuel inlet of the first heat exchanger and at the fuel outlet of the first heat exchanger respectively.

In an embodiment, the conditioning system further comprises at least four additional pressure sensors located at the first inlet, the first outlet, the second inlet and the second outlet of the second heat exchanger.

The at least two pressure sensors and/or the at least four additional pressure sensors help monitoring the pressure inside the first and/or the second heat exchanger respectively during operation mode. For example, the inlet pressure at the fuel inlet of the first heat exchanger is higher than the pressure at the fuel outlet, under normal conditions, due to pressure losses inside the heat exchanger. When the pressure difference exceeds a certain threshold, which is a value previously set, then, the monitoring provided by the at least two pressure sensors helps detecting if there is a fuel leak and, thus, the conditioning system is shut off. The same reasoning applies for the at least four additional pressure sensors of the second heat exchanger.

In an embodiment, the fuel of the fuel conduit is hydrogen ($H_2$).

In an embodiment, the fuel of the fuel conduit is pure hydrogen.

In an embodiment, the fuel of the fuel conduit is a mixture of hydrogen and fuel such as methane, propane, butane etc. In the particular case of the fuel of the fuel conduit being a mixture, hydrogen is the majority of the mixture.

In a second inventive aspect, the present invention provides an aircraft comprising a conditioning system according to any embodiment of the first inventive aspect.

In a third inventive step, the present invention provides a method for conditioning fuel of a conditioning system according to any embodiment comprising only the first heat exchanger, when the aircraft is on ground or in flight, the method comprising the following steps:
supplying fuel to the fuel conduit through the fuel inlet,
opening the bypass conduit,
supplying fuel from the first portion of the fuel conduit to the second portion of the fuel conduit through the bypass conduit,
actuating the heater configured to supply heat to the fuel of the second portion of the fuel conduit until a fuel temperature reference value $T_E$,
running the engine,
closing the bypass conduit,
actuating the first heat exchanger configured to supply heat from the exhausted gases to the fuel of the fuel conduit wherein the temperature of the fuel increases from a first temperature $T_1$ to a second temperature $T_2$,
stopping the heater when the fuel temperature $T_2$ is equal to the reference value $T_E$.

In embodiments where the conditioning system of the invention does not comprise a second heat exchanger, the method for conditioning fuel of a conditioning system comprises the above-mentioned steps.

In the present document, "opening the bypass conduit" refers to connecting the first portion of the fuel conduit directly to the second portion of the fuel conduit. That is, the fuel located inside the fuel conduit is not introduced in the first heat exchanger but oriented towards the heater. That is, the bypass conduit acts as a bridge. On the contrary, "closing the bypass conduit" means that the first portion of the fuel conduit and the second portion of the fuel conduit are not directly connected via the bypass and that the whole volume of fuel injected through the fuel inlet of the conditioning system is introduced inside the fuel inlet of the first heat exchanger.

The fuel temperature reference value $T_E$ is the temperature of the fuel required so that the engine of the conditioning system reaches its optimal operative conditions. The fuel temperature reference value $T_E$ may be around 290 K, such as within 10% of 290 K.

In the present method, the temperature of the fuel increases from a first temperature $T_1$ to a second temperature $T_2$ after heat have been supplied to the fuel through the first heat exchanger. In operative conditions, the second temperature $T_2$ may be equal to, or as a value close to, the fuel temperature reference value $T_E$. In that case, the performance provided by the first heat exchanger is able to supply the whole quantity of heat necessary to the fuel so that it reaches the fuel temperature reference value $T_E$.

In some embodiment, the temperature of the fuel at the fuel inlet is equal to the first temperature $T_1$, such as 20 K or within 10% of 20 K.

In a fourth inventive step, the present invention provides a method for conditioning fuel of a conditioning system (100) according to any embodiment comprising a first heat exchanger and a second heat exchanger, when the aircraft is on ground or in flight, the method comprising the following steps:
supplying fuel to the fuel conduit through the fuel inlet,
opening the bypass conduit, supplying fuel from the first portion of the fuel conduit to the second portion of the fuel conduit,
actuating the heater configured to supply heat to the fuel of the second portion of the fuel conduit until a fuel temperature reference value $T_E$,
running the engine,
closing the bypass conduit,
actuating the first heat exchanger configured to supply heat from the exhausted gases to the fuel of the fuel conduit wherein the temperature of the fuel increases from a first temperature $T_1$ to a second temperature $T_2$,
actuating the second heat exchanger configured to supply heat from the liquid fuel of the second portion of the fuel conduit to the liquid fuel of the first portion of the fuel conduit, and to turn the fuel of the fuel conduit from liquid form or supercritical fluid form into low temperature gas form.

In embodiments where the conditioning system of the invention comprises a second heat exchanger, the method for conditioning fuel of a conditioning system comprises the above-mentioned steps.

The fuel temperature reference value $T_E$ is the temperature of the fuel required so that the engine of the conditioning system reaches its optimal operative conditions. The fuel temperature reference value $T_E$ may be around 290 K or within 10% of 290 K.

In the present method, the temperature of the fuel increases from a first temperature $T_1$ to a second temperature $T_2$ after heat have been supplied to the fuel through the first heat exchanger. In that case, the performance provided by the first heat exchanger is able to supply the whole quantity of heat necessary to the fuel so that it reaches the fuel temperature reference value $T_E$.

In some embodiment, the temperature of the fuel at the fuel inlet is equal to the first temperature $T_1$, such as around 20 K.

In step g), and thanks to the second heat exchanger, and when the temperature $T_2$ is greater to the temperature $T_1$, the temperature of the fuel at the fuel outlet of the first heat exchanger generates heat in order to supply said heat to the fuel of the first portion of the fuel conduit and provide a preheating of the fuel before being injected inside the first heat exchanger. Also, when the second heat exchanger is actuated, the fuel introduced in the second heat exchanger through the first inlet is outputted through the first outlet and has been turned from liquid form or supercritical fluid form into low temperature gas form. In this case, the second heat exchanger also helps as evaporation means when the fuel turn from liquid phase to gas phase.

In both of the above methods, the conditioning system aims to condition the fuel of the fuel conduit without supplying heat thanks to the heater. That is, both conditioning methods provide step h) in which the heater are stopped once the fuel temperature $T_2$ is equal to the reference value $T_E$ before injection inside the engine.

When the fuel temperature $T_2$ is greater to the reference value $T_E$, the second heat exchanger make use of the excess of temperature to transfer heat to the fuel located in the first portion of the fuel conduit. At the same time, the second heat exchanger helps reducing the fuel temperature $T_2$ so that, at the second outlet of the second heat exchanger, the fuel temperature is equal to the reference value $T_E$.

In an embodiment, the bypass conduit may be partially closed in order to orientate part of the fuel towards the first heat exchanger and the remaining part of the fuel towards the second heat exchanger. The heat exchanger allows the conditioning system of the invention to adapt at all times to the conditions of the fuel located inside the conditioning system while in operation mode.

In an embodiment of the third or the fourth inventive aspect, the method for conditioning fuel of the conditioning system, when the conditioning system comprises at least two pressure sensors a valve located at the fuel inlet of the first heat exchanger, the method further comprises the step of closing the valve if the delta between the pressure measured at the fuel inlet of the first heat exchanger and the pressure measured at the fuel outlet of the first heat exchanger exceeds a first predetermined threshold.

In an embodiment, the method for conditioning fuel of the conditioning system of the invention, when the conditioning system comprises at least four additional pressure sensors and a valve located at the fuel inlet of the first heat exchanger, the method further comprises the step of closing the valve:
- if the delta between the pressure measured at the first fuel inlet of the second heat exchanger and the pressure measured at the first fuel outlet of the second heat exchanger exceeds a second predetermined threshold, or
- if the delta between the pressure measured at the second fuel inlet of the second heat exchanger and the pressure measured at the second fuel outlet of the second heat exchanger exceeds a third predetermined threshold.

The first, the second and the third predetermined thresholds are values, which may be modified at all times while in operation mode, so that the conditioning system of the invention can be adapted to real time conditions.

In an embodiment, one failure mode is detected by the at least two pressure sensors when the pressure measured by the pressure sensor located at the fuel outlet of the first heat exchanger is not equal to the pressure measured by the pressure sensor located at the fuel inlet of the first heat exchanger.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from an embodiment of the invention, given just as an example and not being limited thereto, with reference to the drawings.

DETAILED DESCRIPTION

Figure 1:
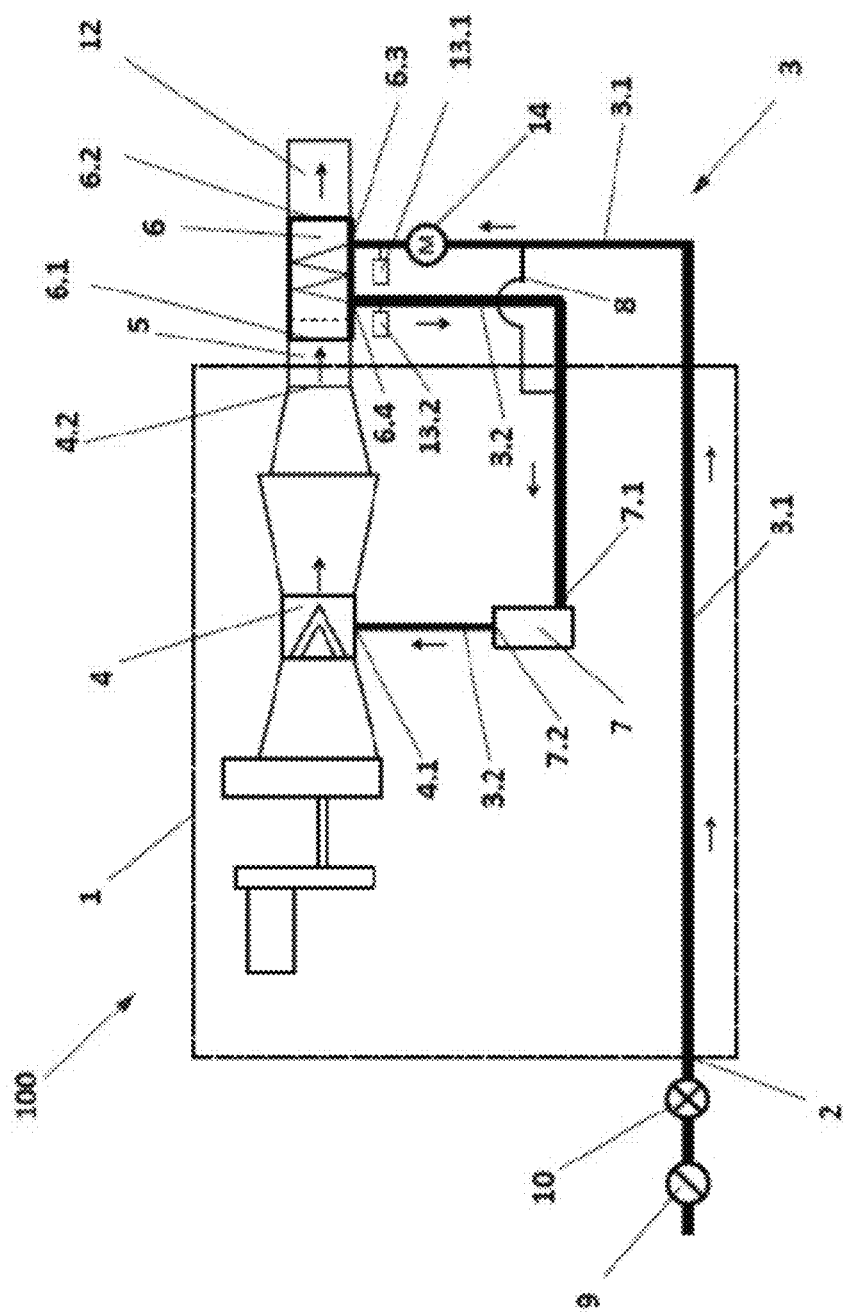
FIG. 1 shows an embodiment of the conditioning system according to an embodiment of the present invention.

FIG. 1 shows a schematic representation of a conditioning system (100) for an aircraft according to an embodiment of the invention.

The conditioning system (100) of FIG. 1 has a power unit (1) which comprises a fuel inlet (2), a fuel conduit (3) (such as a conduit), an engine (4), a power unit outlet (5), a first heat exchanger (6), heater (7) and a bypass conduit (8) (such as a conduit). In this FIG. 1, the arrow shown along the fuel conduit (3) (such as a conduit) and inside the engine (4) represents the direction of fuel flow.

In an embodiment, the power unit (1) is an Auxiliary Power Unit (APU). In other embodiments, the power unit (1) is a propeller.

In the embodiment of FIG. 1, the conditioning system (100) comprises pump (10) and a valve (9), both configured to supply fuel to the power unit (1) and located at or upstream of the fuel inlet (2). In particular, the pump (10) helps maintain the require pressure of fuel injection inside the power unit (1) at the fuel inlet (2). Also, the valve (9) allows opening and closing the conditioning system (100) in case of performing maintenance or in any event requiring closing the fuel entry in the power unit (1) such as damages or failure of any element of the power unit (1).

In some embodiments, the fuel is hydrogen. The hydrogen may be stored at 20 K (Kelvin), before being injected into the power unit (1), and the conditioning system (100) of the invention, through the first heat exchanger (6), is able to provide heat to the hydrogen such that the temperature of the hydrogen before entering the engine (4) is around 290 K.

The fuel inlet (2) is configured to supply fuel to the fuel conduit (3). A first portion (3.1) of the fuel conduit (3) connects the fuel inlet (2) of the conditioning system (100) to the fuel inlet (6.3) of the first heat exchanger (6) and a second portion (3.2) of the fuel conduit (3) connects the fuel outlet (6.4) of the first heat exchanger (6) to the inlet (4.1) of the engine (4).

The power unit outlet (5) is configured to exhaust gases out of the engine (4). The power unit outlet is connected to the exhaust gas inlet (6.1) of the first heat exchanger (6) so that the exhaust gases are provided to the first heat exchanger (6) at its highest temperature. The exhaust gases are outputted of the first heat exchanger (6) through the gas outlet (6.2).

In particular embodiments, the engine (4) is a gas turbine with an exhaust gas outlet (4.2).

In the embodiment of FIG. 1, a muffler (12) is connected to the exhaust gas outlet (6.2) of the first heat exchanger (6). The muffler suppresses sound emanating from the exhaust of the engine.

The first heat exchanger (6) may be upstream of the muffler (12) or within the muffler (12).

In some embodiments, the heat exchanger (6) is a pillow plate heat exchanger type. Pillow plate heat exchangers provide high performance in a more compact structure and lower weight and lower pressure drop than common heat exchangers while providing good structural stability.

The first heat exchanger (6) may enclose an entire perpendicular cross-section of the power unit outlet (5).

In the embodiment shown in FIG. 1, the fuel inlet (6.3) and the fuel outlet (6.4) of the first heat exchanger (6) are mounted in counterflow with respect to the exhaust gas inlet (6.1) and exhaust gas outlet (6.2) of the first exchanger (6). In this figure, the flow of the fuel located inside the fuel conduit (3) and the flow of the exhaust gases are depicted by solid arrows.

In FIG. 1, the heater (7) of the power unit (1) has a fuel inlet (7.1) and a fuel outlet (7.2). The heater (7) is located between the first heat exchanger (6) and the engine (4). Heater (7) turns the fuel of the fuel conduit (3) from liquid form or supercritical fluid form (SCF) into low temperature gas form and are also configured to supply heat to the fuel of the fuel conduit (3) located in the second portion (3.2) of the fuel conduit (3).

The heater (7) may be provided with a dedicated battery so that the functioning of the heater (7) is independent of the rest of elements of the conditioning system (100). The battery may apply energy to heat heating coils within the heater.

Also, in some embodiments, the heater (7) is encapsulated in order to avoid leakage outside the encapsulation of the heater (7) which may damage the rest of the conditioning system (100).

The conditioning system (100) has a bypass conduit (8) to connect the first portion (3.1) of the fuel conduit (3) to the second portion (3.2) of the fuel conduit (3). When the bypass conduit (8) is opened, the fuel located in the first portion (3.1) of the fuel conduit (3) is directly oriented towards the second portion (3.2) of the fuel conduit (3) without entering the first heat exchanger (6). When the bypass conduit (8) is closed, the fuel located in the first portion (3.1) of the fuel conduit (3) flows and is introduced inside the first heat exchanger (6) through the fuel inlet (6.3). Then, the fuel outputted of the first heat exchanger (6) through the fuel outlet (6.4) is injected in the second portion (3.2) of the fuel conduit (3).

When in operative mode, the first heat exchanger (6) is configured to supply heat from the exhausted gases to the fuel of the fuel conduit (3). Due to the first heat exchanger (6), in particular to the heat transferred from the exhaust gases to the fuel, the temperature of said fuel of the first portion (3.1) of the fuel conduit (3) increases from a first temperature $T_1$ to a second temperature $T_2$ when entering the second portion (3.2) of the fuel conduit (3). Then, the fuel is introduced in the heater (7) at the second temperature $T_2$ which provide the additional heat required to the fuel so that it is outputted at a fuel temperature reference value $T_E$ which is the optimal temperature so that the engine (4) reaches its full performance. The fuel temperature reference value $T_E$ may be around 290 K, e.g., within 10% of 290 K.

When the fuel is introduced in the first heat exchanger (6) at a first temperature $T_1$ and said fuel is outputted of the first heat exchanger (6) at a second temperature $T_2$ equal to the fuel temperature reference value $T_E$, the heater (7) are stopped. In this embodiment, the first heat exchanger (6) is able to provide the whole quantity of heat required so that the fuel reaches the fuel temperature reference value $T_E$. The first temperature $T_1$ may be around 20 K, e.g., within 10% of 20 K, and the second temperature $T_2$ is around 290 K, e.g., within 10% of 290 K.

Figure 2:
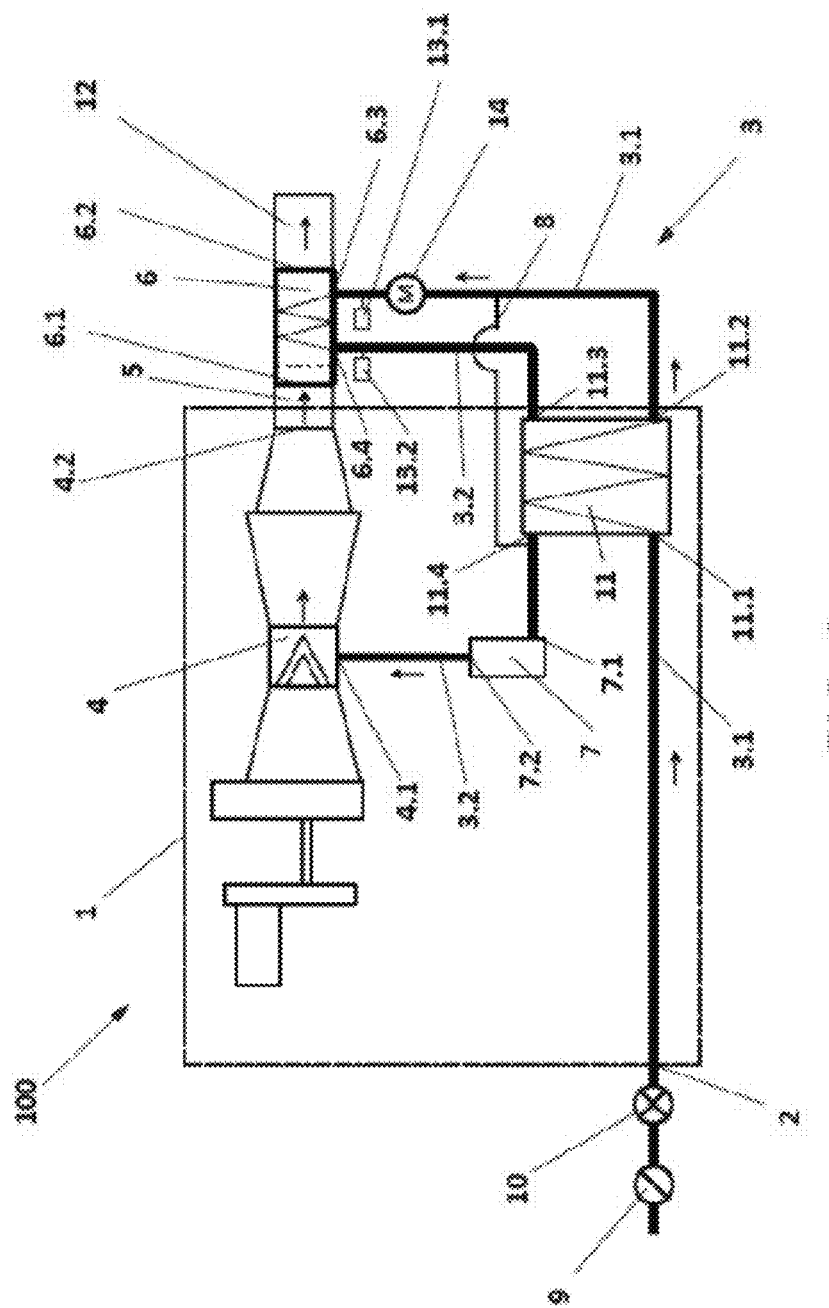
FIG. 2 shows an embodiment of the conditioning system according to an embodiment of the present invention.

FIG. 2 shows another embodiment of the conditioning system (100) which comprises all the elements and technical effects above mentioned in FIG. 1.

The conditioning system (100) of FIG. 2 further comprises a second heat exchanger (11) and two pressure sensors (13.1, 13.2) located at the fuel inlet (6.3) of the first heat exchanger (6) and at the fuel outlet (6.4) of the first heat exchanger respectively.

The second heat exchanger (11) of the embodiment depicted in FIG. 2 has a first inlet (11.1), a first outlet (11.2), a second inlet (11.3) and a second outlet (11.4). The first inlet (11.1) and the first outlet (11.2) of the second heat exchanger (11) are connected to the first portion (3.1) of the fuel conduit (3) and the second inlet (11.3) and the second outlet (11.4) are connected to the second portion (3.2) of the fuel conduit (3)

The second heat exchanger (11) is configured to supply heat from the fuel of the second portion (3.2) of the fuel conduit (3) to the fuel of the first portion (3.1) of the fuel conduit (3), and to turn the fuel of the fuel conduit (3) from liquid form or supercritical fluid form into low temperature gas form.

In the embodiment shown in FIG. 2, the first inlet (11.1) and the first outlet (11.2) of the second heat exchanger (11) are mounted in counterflow with respect to the second inlet (11.3) and the second outlet (11.4) of the second heat exchanger (11). In this figure, the flow of the fuel of the first portion (3.1) of the fuel conduit (3) and the flow of the fuel of the second portion (3.2) of the fuel conduit (3) are depicted by solid arrows.

When in operative mode and that the second temperature $T_2$ at the fuel outlet (6.4) of the first heat exchanger (6) is greater than $T_1$, the second heat exchanger (11) is able to supply heat from the liquid fuel of the second portion (3.2) of the fuel conduit (3) to the liquid fuel of the first portion (3.1) of the fuel conduit (3). Thanks to the second heat exchanger (11), the temperature of the second portion (3.2) of the fuel conduit (3) at the fuel outlet (6.4) of the first heat exchanger (6) is lowered until the fuel temperature $T_2$ equals the reference value $T_E$.

The second heat exchanger (11) is also configured to turn the fuel of the fuel conduit (3) from liquid form or supercritical fluid form into low temperature gas form.

In an embodiment, the bypass conduit (8) may be partially closed in order to orientate part of the fuel towards the first heat exchanger (6) and the remaining part of the fuel towards the second heat exchanger (11). The heat exchanger allows the conditioning system (100) to adapt at all times to the conditions of the fuel located inside the conditioning system (100) while in operation mode.

In an embodiment, not shown in FIG. 1 or 2, the conditioning system (100) further comprises temperature sensors located at the inlets (6.1, 6.3, 11.1, 11.3, 7.1) and outlets (6.2, 6.4, 11.2, 11.4, 7.2) of the first heat exchanger (6), the second heat exchanger (11) and the heater (7) respectively.

In an embodiment, not shown in FIG. 1 or 2, the conditioning system further comprises at least four additional pressure sensors located at the first inlet (11.1), the first outlet (11.2), the second inlet (11.3) and the second outlet (11.4) of the second heat exchanger (11) respectively.

The at least two pressure sensors (13.1, 13.2) and/or the at least four additional pressure sensors helps monitoring the pressure inside the first (6) and/or the second heat exchanger (11) respectively during operation mode.

For example, the inlet pressure at the fuel inlet (6.3) of the first heat exchanger (6) is higher than the pressure at the fuel outlet (6.4), under normal conditions, due to pressure losses inside the heat exchanger. When the pressure difference, also called delta of pressure, exceeds a certain threshold, which is a value previously set, then, the monitoring provided by the at least two pressure sensors (6.3, 6.4) helps detecting if there is a fuel leak and, thus, the conditioning system is shut off. The same reasoning applies for the at least four additional pressure sensors of the second heat exchanger (11).

When in operative mode and the temperature at the second outlet (11.4) of the second heat exchanger (11) is inferior to the fuel temperature reference value $T_E$, the heater (7) are able to provide the additional heat required to the fuel of the second portion (3.2) of the fuel conduit (3). Thanks to the heater (7), the fuel reaches the fuel temperature reference value $T_E$ before being injected inside the engine (4).

When in operative mode and the temperature at the second outlet (11.4) of the second heat exchanger (11) is greater or equal to the temperature reference value $T_E$, the heater (7) are stopped.

For example, the temperature at the fuel inlet (2) of the conditioning system (100) is such as around 20 K and is able to reach 110 K after being outputted of the second heat exchanger thanks to the heat transfer from the fuel of the second portion (3.2) of the fuel conduit (3). At the same time, the fuel has turned to gas form before being injected into the first heat exchanger. At the fuel outlet (6.4) of the first heat exchanger (6), the fuel of the second portion (3.2) of the fuel conduit (3) reaches 380 K, which provides extra heat to the fuel of the first portion (3.1) of the fuel conduit (3) thanks to the second heat exchanger (11). Ideally, the second heat exchanger (11) is able to reduce the temperature of the fuel at 380 K and is configured to output the gas fuel at its second outlet (11.4) at the temperature reference value $T_E$, such as around 290 K.

Also in operative mode, if the delta between the pressure measured by the first pressure sensor (13.1) at the fuel inlet (6.3) of the first heat exchanger (6) and the pressure measured by the second pressure sensor (13.2) at the fuel outlet (6.4) of the first heat exchanger (6) exceeds a first predetermined threshold, then the conditioning system (100) is able to shut down the injection of fuel in the first heat exchanger (6) by means of a valve (14), such as a mechanical valve. Thus, the pressure sensors (13.1, 13.2) provide a failure detection mode so that the conditioning system (100) of the present invention is able to avoid further damages.

In an embodiment, wherein the conditioning system (100) comprises at least four additional pressure sensors and a valve (14) located at the fuel inlet (6.3) of the first heat exchanger (6), the method further comprises the step of closing the valve (14): if the delta between the pressure measured at the first fuel inlet (11.1) of the second heat exchanger (11) and the pressure measured at the first fuel outlet (11.2) of the second heat exchanger (11) exceeds a second predetermined threshold, or if the delta between the pressure measured at the second fuel inlet (11.3) of the second heat exchanger (11) and the pressure measured at the second fuel outlet (11.4) of the second heat exchanger (11) exceeds a third predetermined threshold.

Figure 3:
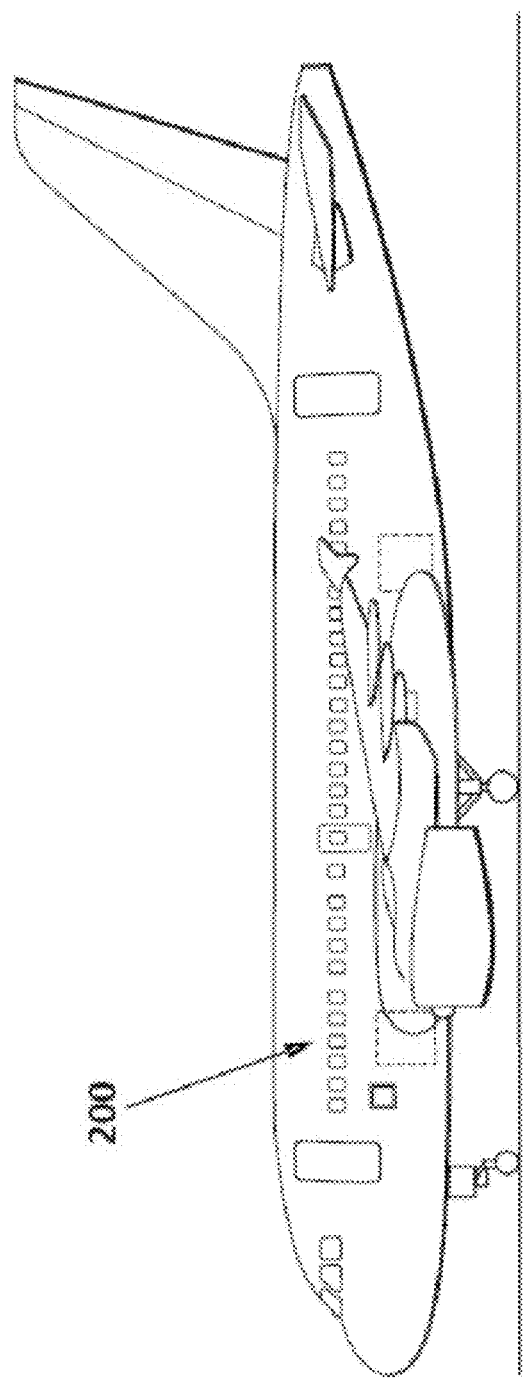
FIG. 3 shows an embodiment of the aircraft comprising a conditioning system according to any embodiment of the present invention.

FIG. 3 shows an aircraft (200) comprising a conditioning system (100) according to any embodiment of the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A conditioning system for an aircraft including a power unit, wherein the power unit comprises:
    a fuel conduit with a fuel inlet configured to receive a liquid fuel and supply the liquid fuel to the fuel conduit,
    an engine comprising an inlet connected to the fuel conduit and an exhaust gas outlet connected to a power unit outlet,
    the power unit outlet is configured to receive exhaust gas from the engine,
    a first heat exchanger connected to the power unit outlet, wherein the first heat exchanger comprises an exhaust gas inlet, an exhaust gas outlet, a fuel inlet and a fuel outlet,
    a second heat exchanger including a first inlet, a first outlet, a second inlet, and a second outlet,
    a first portion of the fuel conduit connecting the fuel inlet of the fuel conduit to the fuel inlet of the first heat exchanger and a second portion of the fuel conduit connecting the fuel outlet of the first heat exchanger to the inlet of the engine,
    a heater comprising a fuel inlet and a fuel outlet, the heater is located between the first heat exchanger and the engine, wherein the heater is configured to heat the fuel flowing through the fuel conduit and is configured to covert the fuel flowing through the fuel conduit from a liquid phase or a supercritical fluid (SCF) phase to a gas phase, and
    a bypass conduit connecting the first portion of the fuel conduit to the second portion of the fuel conduit,
    wherein the first heat exchanger is configured to transfer heat from the exhaust gases of the power unit outlet to the fuel of the fuel conduit,
    wherein the first inlet and the first outlet of the second heat exchanger are connected to the first portion of the fuel conduit and the second inlet and the second outlet of the second heat exchanger are connected to the second portion of the fuel conduit, and
    wherein the second heat exchanger is configured to supply heat from the fuel flowing through of the second portion of the fuel conduit to the fuel flowing through of the first portion of the fuel conduit, and to convert the fuel flowing through the first portion of the fuel conduit from the liquid phase or the supercritical fluid phase to a low temperature gas phase.

2. The conditioning system according to claim 1, further comprising a valve configured to open or close the flow of the fuel entering the conditioning system at the fuel inlet.

3. The conditioning system according to claim 1, further comprising a pump configured to supply fuel to the power unit.

4. The conditioning system according to claim 1, further comprising a muffler wherein the first heat exchanger is configured to be coupled inside the muffler.

5. The conditioning system according to claim 1, wherein the first heat exchanger is configured to enclose an entire perpendicular cross-section of the power unit outlet.

6. The conditioning system according to claim 1, wherein the fuel inlet and the fuel outlet of the first heat exchanger are mounted in counterflow with respect to the exhaust gas inlet and the exhaust gas outlet of the first exchanger.

7. The conditioning system according to claim 1, wherein the first inlet and the first outlet of the second heat exchanger are mounted in counterflow with respect to the second inlet and the second outlet of the second heat exchanger.

8. The conditioning system according to claim 1, further comprising a temperature sensor.

9. The conditioning system according to claim 1, further comprising a first pressure sensor proximate the fuel inlet of the first heat exchanger and a second pressure sensor proximate the fuel outlet of the first heat exchanger.

10. The conditioning system according to claim 1, wherein the fuel is hydrogen ($H_2$).

11. An aircraft comprising the conditioning system according to claim 1.

12. The conditioning system of claim 1, wherein the bypass conduit is configured to be open with the temperature of the fuel flowing from the second portion of the fuel conduit into the heater is below a fuel temperature reference value TE and the bypass conduit is configured to be closed while the fuel flowing from the heater is above the fuel temperature reference value TE, and wherein the bypass conduit when open directs the fuel flowing form the first portion into the second portion and blocks fuel flow into the first heat exchanger and the bypass conduit when closed prevents fuel flow through the bypass conduit and directs the fuel flow into the first heat exchanger.

13. The conditioning system of claim 1, wherein the heater receives energy for heating the fuel independently of the engine.

14. A method for conditioning fuel on an aircraft, wherein the aircraft includes:
   a fuel conduit including a fuel inlet configured to receive fuel in a liquid phase,
   an engine connected to the fuel conduit, wherein the power unit engine is configured to combust the fuel from the fuel conduit and exhaust gases from the combustion to a power unit outlet,
   a first heat exchanger,
   a first portion of the fuel conduit fluidically connecting the fuel inlet of the fuel conduit to an inlet to the first heat exchanger and a second portion of the fuel conduit fluidically connecting an outlet of the first heat exchanger to a fuel inlet of the engine, and
   a heater fluidically coupled to the first portion of the fluid conduit and configured to heat the fuel flowing through the second portion, wherein the heater is in the second fluid conduit downstream in the flow of fuel, and
   a bypass conduit fluidically connecting the first portion to the second portion and bypassing the first heat exchanger, wherein the bypass conduit is in fluid communication with the second portion upstream in the flow of fuel to the heater,
   wherein the method includes:
   supplying the fuel in the liquid phase to the first portion of the fuel conduit through the fuel inlet,
   opening the bypass conduit to allow fuel to flow from the first portion, through the bypass conduit and to the second portion while the fuel temperature entering the heater is below the fuel temperature reference value TE,
   supplying the fuel from the first portion of the fuel conduit to the second portion of the fuel conduit via the bypass conduit,
   actuating the heater to supply heat to the fuel flowing through the second portion of the fuel conduit while the fuel temperature entering the heater is below a fuel temperature reference value TE,
   operating the engine by combusting the fuel in the engine flowing into the engine from the second portion of the fuel conduit,
   while the fuel temperature is below the fuel temperature reference value TE, keeping the bypass conduit open to direct the flow of the fuel through the bypass conduit and to bypass the heat exchanger,
   closing the bypass conduit to prevent fuel flow through the bypass conduit when the fuel temperature at the outlet of the heater is above the fuel temperature reference value TE;
   while the bypass conduit is closed and the fuel temperature is above the fuel temperature reference value TE, directing fuel through the first heat exchanger to transfer heat from the exhausted gases to the fuel flowing through the first heat exchanger, and
   stopping or reducing heat transfer by the heater to the fuel flowing the heater when the fuel temperature at the inlet to the heater is above the reference value TE.

15. The method for conditioning fuel of the conditioning system according to claim 14, wherein the conditioning system further comprises a first pressure sensor proximate the fuel inlet of the first heat exchanger, a second pressure sensor proximate the fuel outlet of the first heat exchanger, and a valve in a fluid path through the first heat exchanger, and
   wherein the method further comprises closing the valve if a difference in a first pressure measured by the first pressure sensor and a second pressure measured by the second pressure sensor exceeds a first pressure threshold.

16. The method of claim 14, wherein the heat supplied by the heater to the fuel is independent of the power unit.

17. A method for conditioning fuel on an aircraft, wherein the aircraft includes:
   a fuel conduit with a fuel inlet;
   an engine coupled to the fuel conduit, configured to combust fuel received from the fuel conduit and exhaust combustion gases into an exhaust outlet duct;
   a first heat exchanger connected to the exhaust outlet duct and configured to transfer heat from the combustion gases into fuel flowing through the first heat exchanger,
   a first portion of the fuel conduit between the fuel inlet of the fuel conduit and a fuel inlet to the first heat exchanger and a second portion of the fuel conduit between a fuel outlet of the first heat exchanger and a fuel inlet to the engine,
   a heater coupled to a portion of the second portion of the fuel conduit, wherein the heater is configured heat fuel flowing through the second portion of the fuel conduit to covert the fuel from a liquid phase or supercritical fluid (SCF) phase to a gas phase,
   a bypass conduit configured to connect the first portion of the fuel conduit to the second portion of the fuel conduit, wherein the bypass conduit connects to the second portion upstream in the fuel flow of the heater, and
   a second heat exchanger including a first inlet and a first outlet connected to the first portion of the fuel conduit and a second inlet and a second outlet connected to the second portion of the fuel conduit,
   wherein the method includes:
   supplying the fuel in the liquid phase or the supercritical fluid (SCF) phase to the fuel conduit through the fuel inlet,
   opening the bypass conduit while the temperature of the fuel entering the heater is below a fuel temperature reference value TE, wherein the bypass conduit when open directs fuel from the first portion, through the bypass conduit and to the second portion while bypassing in the fuel flow the first heat exchanger, wherein the bypass conduit is in fluid communication with the second portion downstream in the flow of fuel from the second heat exchanger,
   supplying the fuel from the first portion of the fuel conduit to the second portion of the fuel conduit via the bypass conduit while the bypass conduit is open,
   supplying heat from the heater to the fuel flowing through the second portion of the fuel conduit at least until the fuel temperature at the inlet to the heater reaches the fuel temperature reference value TE, operating the engine by combusting the fuel flowing through the second portion and into the engine and generating the combustion gases from the combustion of the fuel, closing the bypass conduit as the fuel temperature entering the engine is above the fuel temperature reference TE, while the bypass conduit is closed, actuating the first heat exchanger to supply heat from the exhaust gases to the fuel of the fuel conduit, wherein the temperature of the fuel in the first heat exchanger increases from a first temperature T1 to a second temperature T2, and actuating the second heat exchanger to supply heat from the fuel flowing through the second portion of the fuel conduit to the fuel flowing through the first portion of the fuel conduit, and to assist in converting the fuel from the liquid phase or the supercritical fluid phase to the gas phase.

18. The method of claim 17, wherein the heat supplied by the heater to the fuel is independent of the engine.

* * * * *